(12) United States Patent  
Chen et al.

(10) Patent No.: US 11,825,181 B2
(45) Date of Patent: Nov. 21, 2023

(54) SYSTEM WITH IMAGE SENSORS COMBINATION AND DEVICE FOR GENERATING SINGLE AND COMPOUND FIELD OF VIEW IMAGES

(71) Applicant: RAYZ TECHNOLOGIES CO. LTD., Beijing (CN)

(72) Inventors: Ruxin Chen, Beijing (CN); Detao Du, Beijing (CN)

(73) Assignee: RAYZ TECHNOLOGIES CO. LTD., Beijing (CN)

( * ) Notice: Subject to any disclaimer, the term of this patent is extended or adjusted under 35 U.S.C. 154(b) by 430 days.

(21) Appl. No.: 17/000,477

(22) Filed: Aug. 24, 2020

(65) Prior Publication Data

US 2021/0058535 A1 Feb. 25, 2021

(30) Foreign Application Priority Data

Aug. 22, 2019 (CN) .......................... 201910776669.2

(51) Int. Cl.
*H04N 23/54* (2023.01)
*G06F 1/10* (2006.01)
*G06T 7/557* (2017.01)
*G06T 7/00* (2017.01)

(52) U.S. Cl.
CPC .............. *H04N 23/54* (2023.01); *G06F 1/10* (2013.01); *G06T 7/0004* (2013.01); *G06T 7/557* (2017.01)

(58) Field of Classification Search
CPC .............. H04N 5/2253; H04N 5/2256; H04N 5/23227; H04N 5/2353; H04N 5/2354; H04N 5/2355; H04N 5/35563; H04N 5/3765; H04N 5/2258; H04N 5/3415; H04N 5/351; H04N 5/355; H04N 5/374; G06F 1/10; G06T 7/0004; G06T 7/557
See application file for complete search history.

(56) References Cited

U.S. PATENT DOCUMENTS

| | | | | |
|---|---|---|---|---|
| 8,471,920 B2 * | 6/2013 | Georgiev | ............... | G03B 35/10 396/89 |
| 9,001,227 B2 | 4/2015 | Aleksic et al. | | |
| 2016/0028949 A1 * | 1/2016 | Lee | ........................ | H04N 23/45 348/218.1 |
| 2016/0187199 A1 * | 6/2016 | Brunk | .................... | G01J 3/0208 348/89 |

(Continued)

FOREIGN PATENT DOCUMENTS

| | | |
|---|---|---|
| CN | 102037717 A | 4/2011 |
| CN | 102316253 A | 1/2012 |

(Continued)

*Primary Examiner* — Hung H Lam
(74) *Attorney, Agent, or Firm* — Loeb & Loeb LLP

(57) ABSTRACT

Provided is a system with image sensors combination, including: a plurality of image sensors located in a same semiconductor chip package; and a controller for controlling the plurality of image sensors to operate in coordination, wherein each image sensor includes: a plurality of photosensitive pixel cells to be simultaneously exposed to generate analog photosensitive signals; an analog-to-digital converters for converting the analog photosensitive signals generated by the plurality of photosensitive pixel cells into image sensor signals; and a timing circuit for controlling the generation, readout, and transmission of electrical signals.

9 Claims, 2 Drawing Sheets

(56) References Cited

U.S. PATENT DOCUMENTS

| | | | | |
|---|---|---|---|---|
| 2016/0227138 | A1* | 8/2016 | Kozlowski | H01L 27/14609 |
| 2016/0360103 | A1* | 12/2016 | Griffith | H04N 23/951 |
| 2017/0180615 | A1* | 6/2017 | Lautenbach | H04N 23/64 |
| 2017/0186163 | A1* | 6/2017 | Kim | G06T 7/30 |
| 2020/0116558 | A1* | 4/2020 | Pacala | H01L 27/14621 |
| 2021/0399026 | A1* | 12/2021 | Hoshino | H01L 27/14621 |

FOREIGN PATENT DOCUMENTS

| | | |
|---|---|---|
| CN | 102859987 A | 1/2013 |
| CN | 103969920 A | 8/2014 |
| CN | 104717480 A | 6/2015 |
| CN | 205864558 U | 7/2016 |

* cited by examiner

SYSTEM WITH IMAGE SENSORS COMBINATION AND DEVICE FOR GENERATING SINGLE AND COMPOUND FIELD OF VIEW IMAGES

CROSS REFERENCE OF RELATED APPLICATIONS

The present application claims the priority of Chinese patent application No. 201910776669.2, on Aug. 22, 2019, the entire content of these applications are incorporated into the present application by reference herein.

TECHNICAL FIELD

The present disclosure relates to a system with image sensors combination and a device for generating images, and more specifically, to a system with image sensors combination and devices that use the system with image sensor combination to generate a single field of view image and a compound field of view image.

BACKGROUND

Image sensors such as complementary metal oxide semiconductor (COMS) devices have been widely used to generate digital images. When applied to products such as cameras and smart phones, the image sensor is located in a separate semiconductor chip package, called an image sensor chip.

As the consumers are having increasingly higher requirements for image quality and applications such as three-dimensional imaging, it is often necessary to generate a plurality of image sensor signals at the same time, thus a plurality of image sensor chips are used in a product.

However, the increase in the number of image sensor chips increases the manufacturing cost of the product, and is not preferable for the miniaturization of terminal equipment. In addition, when a plurality of image sensor chips are used to generate a plurality of image sensor signals at the same time, it is necessary to control the synchronization of exposure. In some cases, the distance between image sensor chips at different spatial positions may be relatively long (for example, when shooting a binocular parallax three-dimensional image), the transmission delay of the control signal in the cable may affect the quality of synchronization.

SUMMARY

Therefore, the present disclosure provides a system with image sensor combination including a plurality of image sensors. In addition, the present disclosure also provides devices for generating a single field of view image and a compound field of view image using the above-mentioned system with image sensors combination.

According to an aspect of the embodiments of the present disclosure, provided is a system with image sensors combination including: a plurality of image sensors located in a same semiconductor chip package; and a controller for controlling the plurality of image sensors to operate in coordination, wherein each image sensor includes: a plurality of photosensitive pixel cells to be simultaneously exposed to generate analog photosensitive signals; an analog-to-digital converter for converting the analog photosensitive signals generated by the plurality of photosensitive pixel cells into image sensor signals; and a timing circuit for controlling the generation, readout and transmission of electrical signals.

According to an embodiment of the present disclosure, the controller includes an exposure control unit for controlling the timing circuit of each image sensor based on a same clock signal so as to synchronize the start and/or end of exposure.

According to an embodiment of the present disclosure, the controller is located in the same semiconductor chip package.

According to another aspect of the embodiments of the present disclosure, provided is a system with image sensors combination including: a plurality of image sensors located in a plurality of semiconductor chip packages, wherein at least one of the semiconductor chip packages has an optical fiber interface; and a controller for controlling the plurality of image sensors to operate in coordination through an optical control signal transmitted on an optical fiber, wherein each image sensor includes: a plurality of photosensitive pixel cells to be simultaneously exposed to generate analog photosensitive signals; an analog-to-digital converter for converting the analog photosensitive signals generated by the plurality of photosensitive pixel cells into image sensor signals; and a timing circuit for controlling the generation, readout, and transmission of electrical signals.

According to an embodiment of the present disclosure, the controller includes an exposure control unit for controlling the timing circuit of each image sensor based on a same clock signal so as to synchronize the start and/or end of exposure.

According to an embodiment of the present disclosure, the controller and at least one of the image sensors are located in a same semiconductor chip package.

According to another aspect of the embodiments of the present disclosure, there is provided an apparatus for generating a single field of view image, including: an optical imaging device for generating a plurality of beams of imaging light corresponding to a same field of view; the above-mentioned system with image sensors combination for receiving a plurality of beams of imaging light and generating a plurality of image sensor signals; and an image synthesis unit for combining the plurality of image sensor signals into a single field of view image.

According to an embodiment of the present disclosure, the single field of view image is a high dynamic range image.

According to an embodiment of the present disclosure, the respective image sensors in the system with image sensors combination are configured to have a different exposure time.

According to an embodiment of the present disclosure, the respective image sensors in the system with image sensors combination are configured to have different photosensitivity.

According to an embodiment of the present disclosure, the photosensitive pixel cells in at least one image sensor in the system with image sensors combination are divided into a plurality of sensitivity groups, and the photosensitive pixel cells in the respective sensitivity groups are configured to have different photosensitivity.

According to an embodiment of the present disclosure, the optical imaging device includes: an imaging lens group for generating imaging light corresponding to the same field of view; and a light splitting component for splitting the imaging light into a plurality of beams of imaging light.

According to an embodiment of the present disclosure, the single field of view image is a three-dimensional image.

According to an embodiment of the present disclosure, the optical imaging device includes: a plurality of optical imaging units for generating a plurality of beams of imaging light corresponding to a plurality of angles of the same three-dimensional field of view.

According to another aspect of the embodiments of the present disclosure, there is provided a device for generating a compound field of view image, including: an optical imaging device for generating a plurality of beams of imaging light corresponding to a plurality of fields of view; the above-mentioned system with image sensors combination for receiving a plurality of beams of imaging light and generating a plurality of beams of image sensor signals; and an image synthesis unit for synthesizing the plurality of beams of image sensor signals into a compound field of view image.

According to an embodiment of the present disclosure, the optical imaging device controls an incident angle of the received light through a Micro-Electro-Mechanical System (MEMS)-controlled lens.

According to an embodiment of the present disclosure, the device further includes an imaging controller for controlling an incident angle of the received light of the optical imaging device and/or an exposure parameter of the plurality of image sensors in the system with image sensors combination according to a previously generated compound field of view image.

According to an embodiment of the present disclosure, the device further includes a plurality of illumination units for emitting illumination light beams to a plurality of angles to illuminate the corresponding field of view.

According to an embodiment of the present disclosure, wherein the illumination light beams emitted by the plurality of illumination units have different optical properties, and the optical imaging device uses the optical properties to distinguish reflected light from different fields of view.

According to an embodiment of the present disclosure, the optical properties include frequency, polarization, and/or modulation waveform.

According to an embodiment of the present disclosure, the plurality of illumination units control the emission angle of the illumination light beams through a Micro-Electro-Mechanical System (MEMS)-controlled lens.

According to an embodiment of the present disclosure, the device further includes an illumination controller for controlling at least one of frequency, polarization, modulation waveform, emission time, pulse width, and emission angle of the illumination light beams of the plurality of illumination units according to a previously generated compound visual field image.

The single-chip system with image sensors combination according to the present disclosure may reduce the manufacturing cost of components and reduce the space occupied by components.

The optical fiber image sensor combination system according to the present disclosure may improve the accuracy of exposure synchronization control.

Based on the system with image sensors combination according to the present disclosure, the present disclosure also proposes practical and effective devices for generating single-field-of-view images and compound-field-of-view images.

DETAILED DESCRIPTION

Figure 1:
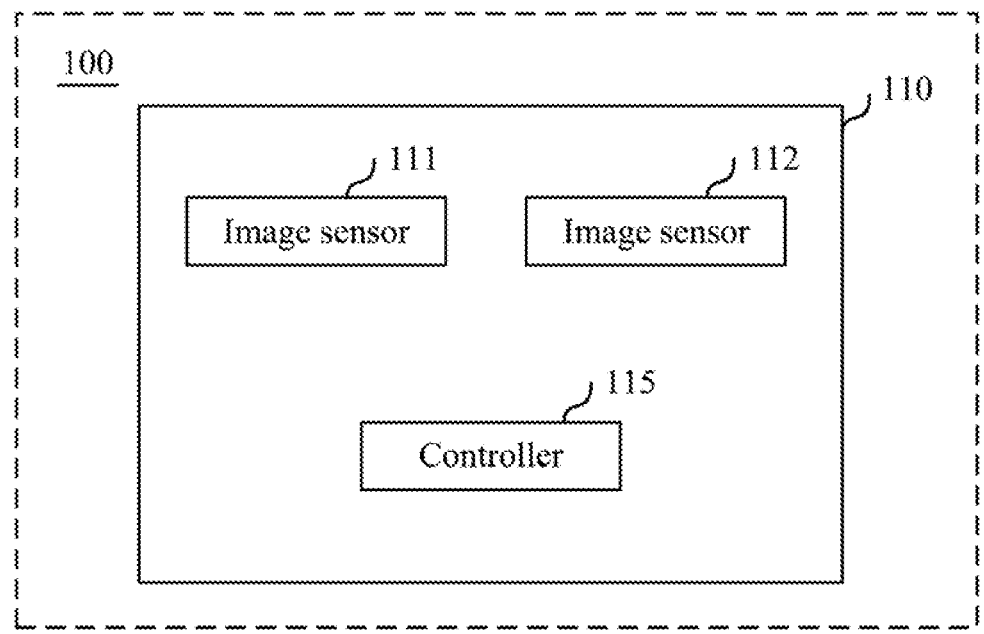
FIG. 1 shows a block diagram of a system 100 with image sensors combination according to an embodiment.

Hereinafter, exemplary embodiments according to the present disclosure will be described in detail with reference to the accompanying drawings. In the drawings, the same or similar reference numerals are given to constituent parts that have substantially the same structure and function, and in order to make the description more concise, redundant descriptions of substantially the same constituent parts are omitted.

FIG. 1 shows a block diagram of a system 100 with image sensors combination according to an embodiment.

Referring to FIG. 1, the system 100 with image sensors combination includes image sensors 111 and 112 and a controller 115, which are integrated in a semiconductor package 110.

Each of the image sensors 111 and 112 includes a plurality of photosensitive pixel cells, an analog-to-digital converter (ADC), and a timing circuit. The photosensitive pixel cells in each of the image sensors are exposed at the same time to generate analog photosensitive signals. The ADC is used to convert the analog photosensitive signal generated by the photosensitive pixel cells into image sensor signals. The timing circuit is used to control the generation, readout, and transmission of electrical signals.

The controller 115 controls the image sensors 111 and 112 to operate in coordination. The controller 115 may include an exposure control unit for controlling the timing circuits of the image sensors 111 and 112 based on a same clock signal so as to synchronize the start and/or end of exposure. Therefore, the synchronization relationship of the exposure time of the image sensors 111 and 112 may be accurately controlled, so that the image sensor signals output from the image sensors 111 and 112 may be conveniently combined for use.

By integrating in a single semiconductor package a plurality of image sensors that are expected to be used together, the manufacturing cost of the product may be reduced, and as the number of chips is reduced, the space occupied by the components may be saved, making it possible to manufacture more compact and thinner products.

In the system 100 with image sensors combination, the controller 115 is integrated with the image sensors 111 and 112 in the semiconductor package 110, but this is only an example. According to the present disclosure, the controller 115 may be located in another semiconductor package.

In the system 100 with image sensors combination, the semiconductor package 110 includes two image sensors, but this is only an example. According to the present disclosure, a greater number of image sensors may be included in a semiconductor package.

Figure 2:
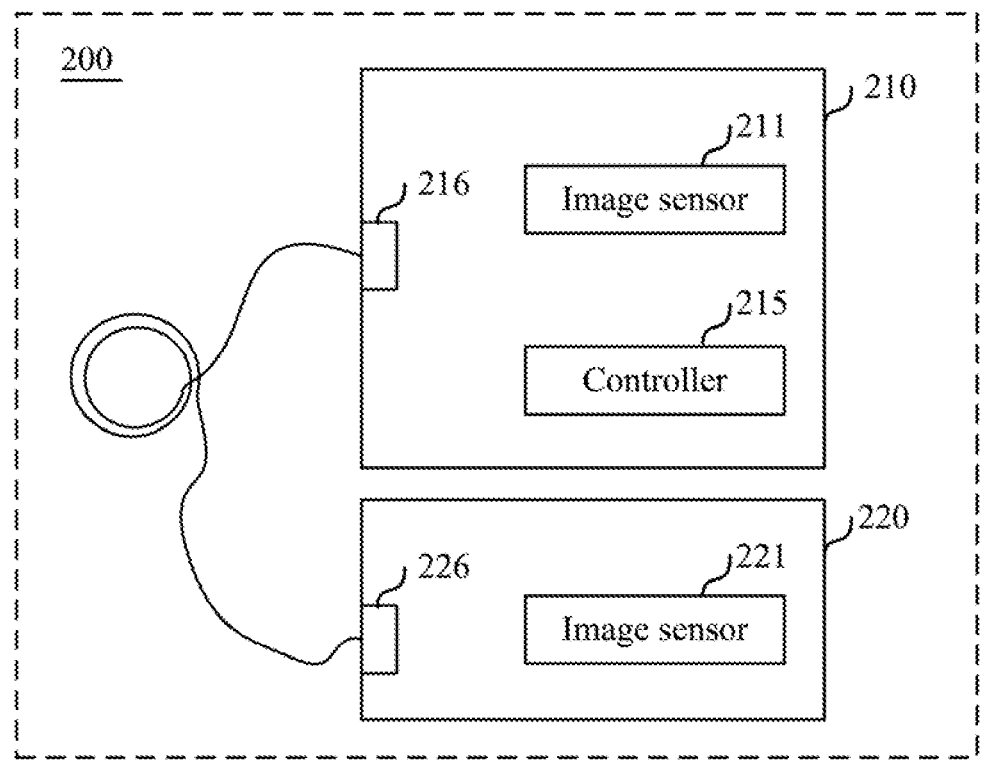
FIG. 2 shows a block diagram of a system 200 with image sensors combination according to an embodiment.

FIG. 2 shows a block diagram of a system 200 with image sensor combination according to an embodiment.

Referring to FIG. 2, the system 200 with image sensors combination includes image sensors 211 and 221 and a controller 215. The image sensor 211 and the controller 215 are integrated in the semiconductor package 210. The image sensor 221 is integrated in the semiconductor package 220.

Similar to the image sensors 111 and 112 in FIG. 1, each of the image sensors 211 and 221 includes a plurality of photosensitive pixel cells, an ADCs, and a timing circuit. The photosensitive pixel cells in each image sensor are exposed at the same time to generate analog photosensitive signals. The ADC is used to convert the analog photosensitive signal generated by the photosensitive pixel cell into an image sensor signal. The timing circuit is used to control the generation, readout, and transmission of electrical signals.

The semiconductor packages 210 and 220 have optical fiber interfaces and are connected to each other through optical fibers.

The controller 115 controls the image sensors 211 and 221 to operate in coordination through light control signals transmitted on the optical fiber. The controller 115 may include an exposure control unit for controlling the timing circuits of the image sensors 211 and 221 based on a same clock signal, so as to synchronize the start and/or end of exposure. Therefore, the synchronization relationship of the exposure time of the image sensors 211 and 221 may be accurately controlled, so that the image sensor signals output from the image sensors 211 and 221 may be conveniently combined for use. Since the transmission delay of the light control signal is small, even if the distance between the image sensors 211 and 221 is relatively long, high-precision synchronization control may be realized.

In the system 200 with image sensors combination, the controller 215 is integrated in the semiconductor package 210 together with the image sensor 211, but this is only an example. According to the present disclosure, the controller 215 may be located in another semiconductor package.

The system 200 with image sensors combination includes two image sensors and two semiconductor chip packages, but this is only an example. According to the present disclosure, the image sensor combination system 200 may include a greater number of image sensors and semiconductor chip packages.

The system 200 with image sensors combination includes two image sensors and two semiconductor chip packages, but this is only an example. According to the present disclosure, the image sensor combination system 200 may include a greater number of image sensors and semiconductor chip packages.

The following describes apparatuses for generating a single field of view image and a compound field of view image using the above-mentioned system with image sensors combination. When a single field of view image is generated, the fields of view of the image sensor signals from different image sensors are identical or similar, and the resulting single field of view is more than 50% the same as the field of view of the image sensor signal of any image sensor. When a compound field of view image is generated, the fields of view of the image sensor signals from different image sensors are different or not similar, and the resulting composite field of view is more than 50% different from the field of view of the image sensor signal of any image sensor.

Figure 3:
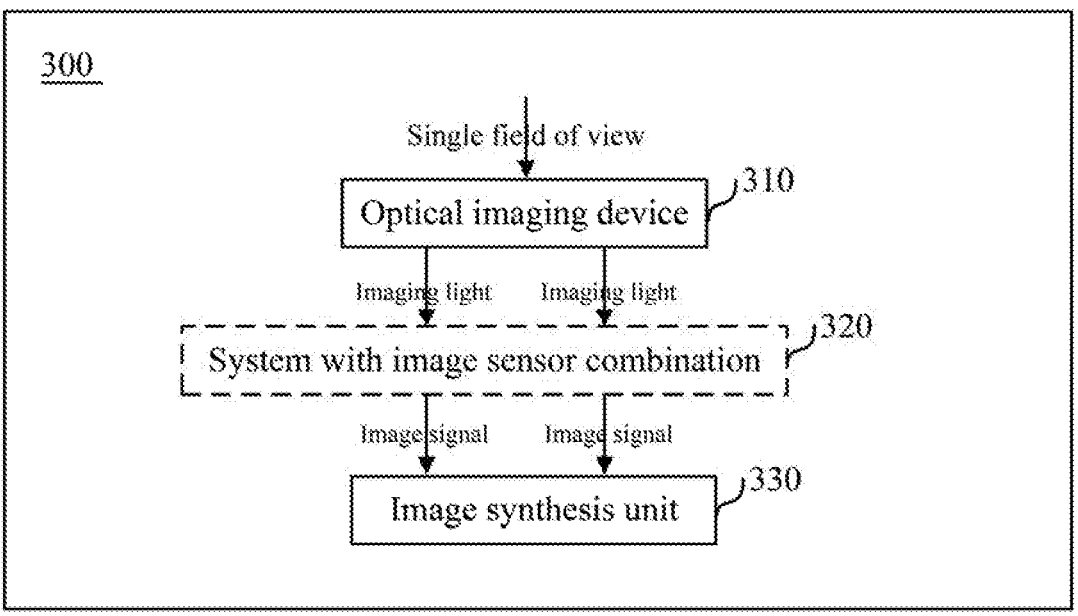
FIG. 3 shows a block diagram of an apparatus 300 for generating a single field of view image according to an embodiment.

FIG. 3 shows a block diagram of an apparatus 300 for generating a single field of view image according to an embodiment.

Referring to FIG. 3, the device 300 includes an optical imaging device 310, a system 320 with image sensors combination, and an image synthesis unit 330.

The optical imaging device 310 generates a plurality of imaging light rays corresponding to the same field of view.

The system 320 with image sensors combination may be the image sensor combination system 100 of FIG. 1 or the image sensor combination system 200 of FIG. 2, which receives a plurality of beams of imaging light from the optical imaging device 310 and generates a plurality of image sensor signals.

The image synthesis unit 330 synthesizes a plurality of image sensor signals into a single field of view image.

According to an embodiment, the single field of view image generated by the device 300 may be a high dynamic range image.

To this end, the optical imaging device 310 may include: an imaging lens group for generating imaging light corresponding to the same field of view; and a light splitting component for splitting the imaging light into a plurality of beams of imaging lights, but this is only an example. According to the present disclosure, the optical imaging device 310 may also include a plurality of imaging lens groups for generating a plurality of beams of imaging light.

The image sensors in the system 320 with image sensors combination may be configured to have different exposure times. The image sensors in the system 320 with image sensors combination may be configured to have different photosensitivity. It is also possible to divide the photosensitive pixel cells in at least one image sensor in the image sensor assembly system 320 into a plurality of sensitivity groups, and configure the photosensitive pixel cells in the respective sensitivity groups to have different sensitivity.

By controlling the exposure time and/or using the above-mentioned different sensitivity configurations, the plurality of image sensor signals output by the system 320 with image sensors combination corresponding to the same field of view may have different exposure parameters (for example, different exposure times). On this basis, the image synthesis unit 330 may synthesize a high dynamic range image.

According to another embodiment, the single field of view image generated by the device 300 may be a three-dimensional image.

To this end, the optical imaging device 310 may include a plurality of optical imaging units for generating a plurality of beams of imaging light corresponding to a plurality of angles of the same three-dimensional field of view. For example, the plurality of optical imaging units may be a plurality of imaging lens groups located at different spatial positions.

By controlling the synchronized exposure, the plurality of image sensor signals output by the system 320 with image sensors combination corresponding to the same three-dimensional field of view may have the same exposure parameters (for example, the same exposure time and/or the same aperture value), and have three-dimensional parallax (For example, binocular parallax). On this basis, the image synthesis unit 330 may synthesize a three-dimensional image.

Figure 4:
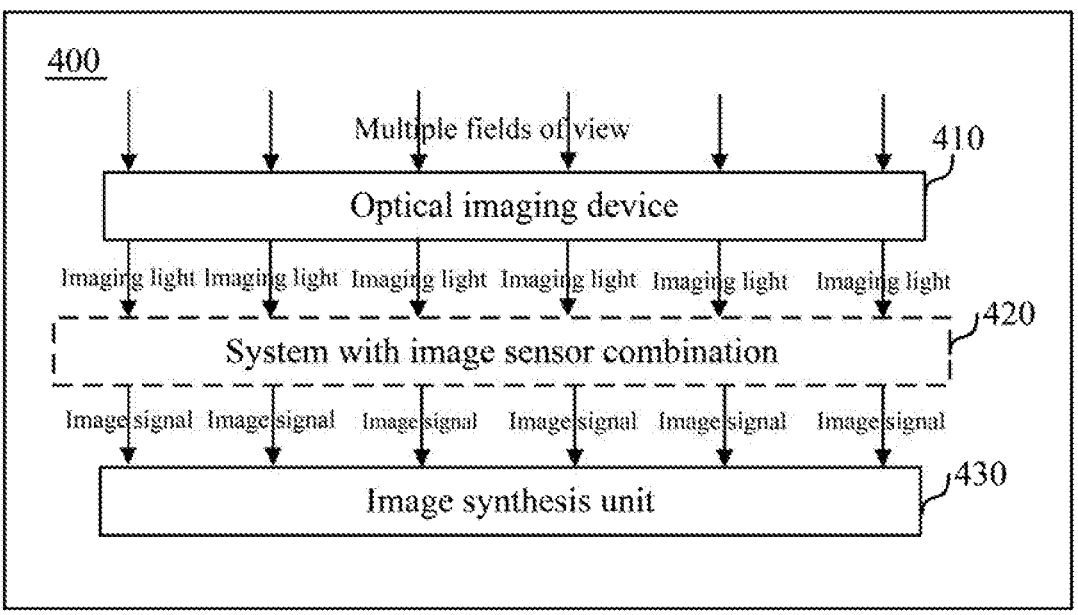
FIG. 4 shows a block diagram of an apparatus 400 for generating a compound field of view image according to an embodiment.

FIG. 4 shows a block diagram of an apparatus 400 for generating a compound view image according to an embodiment.

Referring to FIG. 4, the device 400 includes an optical imaging device 410, an image sensor combination system 420, and an image synthesis unit 430.

The optical imaging device 410 generates a plurality of beams of imaging light corresponding to a plurality of fields of view.

The system 420 with image sensors combination may be the image sensor combination system 100 of FIG. 1 or the image sensor combination system 200 of FIG. 1, which receives the plurality of beams of imaging light from the optical imaging device 410 and generates a plurality of image sensor signals.

The image synthesis unit 430 synthesizes the plurality of image sensor signals into a compound field of view image. For example, similar to the compound-eye imaging of insects, the image synthesis unit 430 may stitch a plurality of field of view images corresponding to the plurality of mage sensor signals into a compound field of view image.

Each image sensor in the system 420 with image sensor combination only processes a narrow field of view, and may include a smaller number of photosensitive pixel cells, thereby greatly improving the processing speed of the device. In addition, the system 420 with image sensors combination may integrate a plurality of image sensors in a single semiconductor chip package, thereby reducing costs and saving space occupied by components.

According to an embodiment, the optical imaging device 410 may control the incident angle of the received light through an Micro-Electro-Mechanical System (MEMS)-controlled lens, so as to receive the light from the corresponding field of view.

According to an embodiment, the device 400 may further include an imaging controller for controlling the incident angle of the received light of the optical imaging device 410 and/or the exposure parameters (for example, the exposure time and/or aperture value) according to a previously generated compound field of view image, so that the quality of the compound view image may be improved through feedback.

According to an embodiment, the device 400 may further include a plurality of illumination units for emitting illumination light beams to a plurality of angles to illuminate the corresponding field of view.

According to an embodiment, the illumination light beams emitted by the plurality of illumination units may have different optical properties, and the optical imaging device 410 uses the optical properties to distinguish reflected light from different fields of view. The optical properties may include frequency, polarization, and/or modulation waveform.

According to an embodiment, the plurality of illumination units may control the emission angle of the illumination light beams through a MEMS-controlled lens, thereby illuminating the corresponding field of view.

According to an embodiment, the device 400 may further include an illumination controller for controlling at least one of frequency, polarization, modulation waveform, emission time, pulse width, and emission angle of the illumination light beams of the plurality of illumination units according to a previously generated composite field image, thereby the lighting effects may be improved through feedback.

As described above, the various embodiments of the present disclosure have been specifically described, but the present disclosure is not limited thereto. Those skilled in the art should understand that various modifications, combinations, sub-combinations or substitutions may be made according to design requirements or other factors, and they are within the scope of the appended claims and their equivalents.

What is claimed is:

1. A device for generating compound field of view images, including:
   an optical imaging device for generating a plurality of beams of imaging light corresponding to a plurality of fields of view;
   a plurality of illumination units for emitting illumination light beams to a plurality of angles to illuminate the corresponding field of view, wherein the illumination light beams emitted by the plurality of illumination units have different optical properties, and the optical imaging device uses the optical properties to distinguish reflected light from different fields of view;
   a plurality of image sensors located in a same semiconductor chip package;
   a controller for controlling the plurality of image sensors to operate in coordination, receive the plurality of beams of imaging light and generate a plurality of image sensor signals; and
   an image synthesis unit for synthesizing the plurality of image sensor signals into a compound field of view image,
   wherein each image sensor includes:
   a plurality of photosensitive pixel cells to be simultaneously exposed to generate analog photosensitive signals;
   an analog-to-digital converter for converting the analog photosensitive signals generated by the plurality of photosensitive pixel cells into image sensor signals; and
   a timing circuit for controlling the generation, readout, and transmission of electrical signals.

2. The device according to claim 1, wherein the controller includes an exposure control unit for controlling the timing circuit of each image sensor based on a same clock signal, so as to synchronize the start and/or end of exposure.

3. The device of claim 1, wherein the controller is located in the same semiconductor chip package.

4. The device according to claim 1, wherein the optical imaging device controls an incident angle of the received light through a Micro-Electro-Mechanical System (MEMS)-controlled lens.

5. The device according to claim 1, further comprising an imaging controller for controlling an incident angle of the received light of the optical imaging device and/or an exposure parameter of the plurality of image sensors in the system with image sensors combination according to a previously generated compound field of view image.

6. The device of claim 1, wherein the optical properties include frequency, polarization, and/or modulated waveform.

7. The device of claim 1, wherein the plurality of illumination units control the emission angle of the illumination light beams through a Micro-Electro-Mechanical System (MEMS)-controlled lens.

8. The device of claim 1, further comprising an illumination controller for controlling at least one of frequency, polarization, modulated waveform, emission time, pulse width, and emission angle of the illumination light beams of the plurality of illumination units according to a previously generated compound field of view image.

9. The device of claim 1, wherein the composite field of view is more than 50% different from the field of view of the image sensor signal of any image sensor.

\* \* \* \* \*